(No Model.)
I. A. LYON.
COVER FOR POTS.
No. 322,189. Patented July 14, 1885.
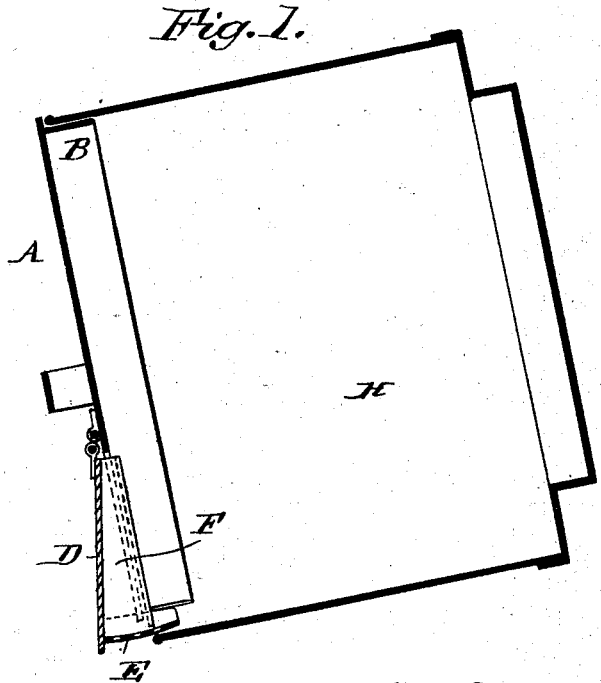
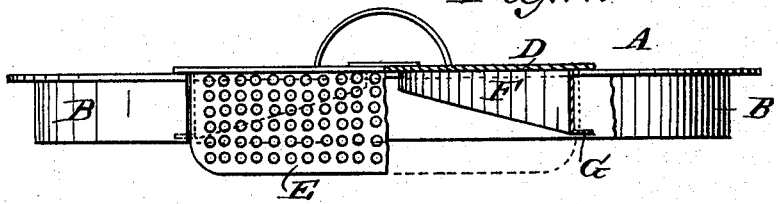
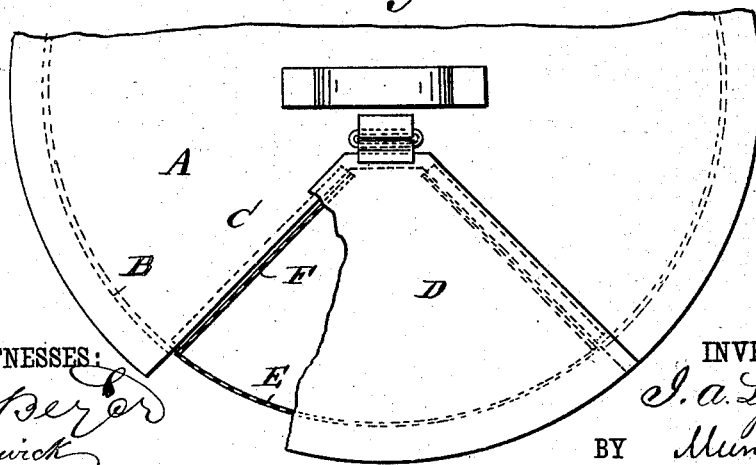
WITNESSES:
INVENTOR:
J. A. Lyon
BY Munn & Co.
ATTORNEYS.

UNITED STATES PATENT OFFICE.

ISABELLA ANN LYON, OF BOSTON, MASSACHUSETTS.

COVER FOR POTS.

SPECIFICATION forming part of Letters Patent No. 322,189, dated July 14, 1885.

Application filed August 26, 1884. (No model.)

*To all whom it may concern:*

Be it known that I, ISABELLA ANN LYON, of Boston, in the county of Suffolk and State of Massachusetts, have invented a new and Improved Cover for Pots, of which the following is a full, clear, and exact description.

The object of my invention is to facilitate drawing off the water from potatoes and other vegetables, meats, &c., without removing them from the pot in which they have been boiled.

The invention consists in the combination, with a cover, of a hinged piece closing an opening in the cover and provided along its swinging outer edge with a downwardly-projecting perforated piece. The hinged piece is provided along the side edges with downwardly-projecting strips having flanges along the bottom edges to prevent the hinged piece from swinging out too far.

Reference is to be had to the accompanying drawings, forming a part of this specification, in which similar letters of reference indicate corresponding parts in all the figures.

Figure 1 is a longitudinal sectional elevation of a pot provided with my improved cover, the pot being tilted. Fig. 2 is an edge view of the cover, parts being broken out. Fig. 3 is a plan view of the cover, parts being broken out.

The cover A, having the usual rim, B, is provided with a sector-shaped opening, C, which is covered by a sector-shaped piece, D, resting on the cover and hinged to the same at its inner or smaller end. At the outer and wider end of the piece D a strip, E, of perforated material or wire-netting is secured to the under side of the said piece, the strip E projecting downward and being curved to be in line with the rim B. Along the side edges of the piece D downwardly-projecting strips F are secured to the under side, the said strips increasing in height from the inner to the outer ends, and being provided on the bottom edges with outwardly-projecting flanges G. The perforated strip E is slightly curved transversely, and projects below the strips F. The cover is placed on the pot H in the usual manner. When the water is to be drawn off, the pot is tilted, as shown in Fig. 1, the piece D swinging outward and permitting the water to flow off through the openings in the strip E. The flanges G prevent the piece D from swinging out too far.

Having thus described my invention, I claim as new and desire to secure by Letters Patent—

1. The combination, with a cover, of a hinged piece covering an opening in the cover, strips projecting downward from the hinged piece, and provided along their bottom edges with outwardly-projecting flanges, and of a downwardly-projecting perforated strip along the swinging outer edge of the hinged piece, substantially as herein shown and described.

2. The cover having the sector-shaped opening, and the sector-shaped hinged piece covering said opening of cover, and having upon its under side downwardly-projecting side strips, and a perforated plate or strip at its forward swinging end, said side strips having outwardly-projecting flanges at their lower edges, substantially as and for the purpose set forth.

ISABELLA ANN LYON.

Witnesses:
JAMES R. MURPHY,
WILLIAM E. CASSIDY.